US006709527B1

(12) United States Patent
Fechter et al.

(10) Patent No.: US 6,709,527 B1

(45) Date of Patent: Mar. 23, 2004

(54) TREATMENT OF SUGAR JUICE

(75) Inventors: Wolfgang L. Fechter, Pinetown (ZA); Peter A. Brewer, Kloof (ZA); Gerrit Van De Pypekamp, Umbogintwini (ZA); Ian A. Smith, Durban (ZA)

(73) Assignee: Ufion (Pty) Limited, Sandton (ZA)

( * ) Notice: Subject to any disclaimer, the term of this patent is extended or adjusted under 35 U.S.C. 154(b) by 0 days.

(21) Appl. No.: 09/700,947

(22) PCT Filed: Mar. 31, 2000

(86) PCT No.: PCT/IB00/00387

§ 371 (c)(1), (2), (4) Date: Apr. 6, 2001

(87) PCT Pub. No.: WO00/60128

PCT Pub. Date: Oct. 12, 2000

(30) Foreign Application Priority Data

Apr. 7, 1999 (ZA) .............................................. 99/2568

(51) Int. Cl.[7] ............................ C13J 1/06; C13D 3/12; C13F 1/02; B01D 15/08; C02F 1/42

(52) U.S. Cl. .......................... 127/46.2; 127/55; 127/58; 210/656; 210/687; 210/705

(58) Field of Search .......................... 127/46.2, 55, 58; 210/656, 687, 705

(56) References Cited

U.S. PATENT DOCUMENTS

| | | | | | |
|---|---|---|---|---|---|
| 4,191,812 | A | * | 3/1980 | Chong | 521/28 |
| 4,329,183 | A | * | 5/1982 | Rousseau et al. | 127/46.2 |
| 5,281,279 | A | | 1/1994 | Gil et al. | 127/46.1 |
| 5,443,650 | A | * | 8/1995 | Saska et al. | 127/46.2 |
| 5,554,227 | A | * | 9/1996 | Kwok et al. | 127/58 |
| 5,624,500 | A | * | 4/1997 | Sanjuan Diaz | 127/30 |
| 5,865,899 | A | | 2/1999 | Theoleyre et al. | 127/42 |
| 5,902,409 | A | | 5/1999 | Kwok et al. | 127/58 |
| 6,096,136 | A | * | 8/2000 | Saska | 127/42 |
| 6,406,548 | B1 | * | 6/2002 | Donovan et al. | 127/55 |

FOREIGN PATENT DOCUMENTS

| | | | | |
|---|---|---|---|---|
| EP | 0 126 512 | | 5/1984 | |
| EP | 0 957 178 | | 11/1999 | |
| FR | 0635578 | * | 1/1995 | C13F/1/14 |

OTHER PUBLICATIONS

Shore, M. et al., "Ion Exchange Processes in Beet Sugar Manufacture," *Chemistry and Processing of Sugarbeet and Sugarcane*, M.A. Clarke and M.A. Goshall, editors, pp. 46–95, 1988, no month available.

Dymond, G.C. et al., "Pre–Clarification and the Ion Exchange Process," *The South African Journal of Sugar Technologists*, pp. 74–82, 1948, no month avail.

Lancrenon, X. et al., "Recent Trnds in the Use of Ion Exchange in the Sugar Industry," *Sugar Technology Reviews*, 14, pp. 207–274, 1988, no month avail.

Saska, M., "Membrane–Based Separations and Countercurrent Multicolumn Systems for Decolorization, Ion Exchange and Ion Exclusion: Emerging Technologies for the Sugar Industry," *International Society of Sugar Cane Technologists*, pp. 147–161.

* cited by examiner

*Primary Examiner*—Elizabeth D. Wood
*Assistant Examiner*—Patricia L. Hailey
(74) *Attorney, Agent, or Firm*—Brinks Hofer Gilson & Lione

(57) ABSTRACT

A process for treating impure cane-derived sugar juice comprises subjecting, in a clarification stage, the juice to microfiltration/ultrafiltration to decrease the levels of suspended solids, organic non-sugar impurities and/or color therein. The resultant clarified sugar juice is sequentially passed through an ion exchange stage by bringing the juice into contact with a strong acid cation ion exchange resin in the hydrogen form, and thereafter into contact with an anion ion exchange resin in the hydroxide form. A purified sugar solution is withdrawn from the ion exchange stage, and concentrated to produce a syrup. The syrup is subjected to primary crystallization in a primary crystallization stage, to produce refined white sugar and primary mother liquor. The primary mother liquor is subjected to secondary crystallization in a secondary crystallization stage, to produce impure crystallized sugar and white strap molasses.

15 Claims, 3 Drawing Sheets

TREATMENT OF SUGAR JUICE

Figure 1:
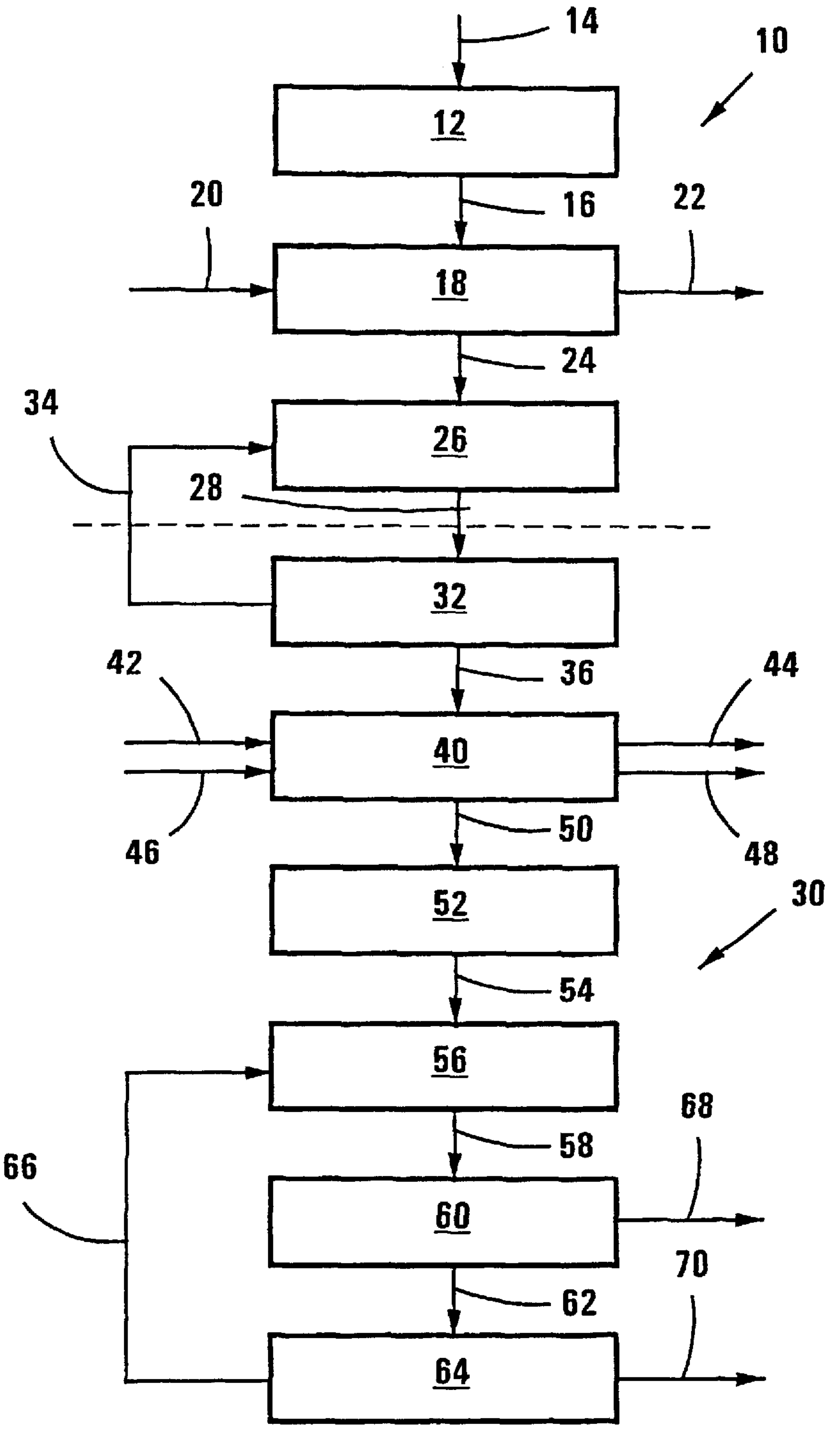

This application is a nationalization of and claims priority under PCT Application No. PCT/IB00/00387 that was filed on Mar. 31, 2000. This application was published, in accordance with PCT Article 21(2), in the English language as WO 00/60128 on Oct. 12, 2000. PCT Application No. PCT/IB00/00387 claimed priority under South African Patent Application Serial No. 99/2568 that was filed on Jul. 4, 1999.

THIS INVENTION relates to the treatment of sugar juice. It relates in particular to a process for treating impure cane-derived sugar juice, typically raw juice which has been subjected to conventional preclarification by heating, liming and settling.

According to the invention, there is provided a process for treating impure cane-derived sugar juice, which process comprises subjecting, in a clarification stage, impure cane-derived sugar juice to microfiltration/ultrafiltration to decrease the levels of suspended solids, organic non-sugar impurities and/or colour therein;

sequentially passing the resultant clarified sugar juice through at least one ion exchange stage by bringing the clarified sugar juice into contact with a strong acid cation ion exchange resin in the hydrogen form, and thereafter into contact with an anion ion exchange resin in the hydroxide form;

withdrawing a purified sugar solution from the ion exchange stage;

concentrating the purified sugar solution, to produce a syrup;

subjecting the syrup to primary crystallization in at least one primary crystallization stage, to produce refined white sugar and primary mother liquor or molasses;

subjecting the primary mother liquor to secondary crystallization in at least one secondary crystallization stage, to produce impure crystallized sugar and secondary mother liquor or white strap molasses.

The impure cane-derived sugar juice typically is that obtained by preparing sugarcane stalks, eg disintegrating or breaking up the stalks; removing sugar juice from the prepared stalks by diffusion and/or milling, using imbibition water, thereby to obtain mixed juice; heating and liming the mixed juice; and subjecting it to primary clarification, to obtain clear juice, ie to obtain the impure cane-derived sugar juice which constitutes the feedstock to the process of the invention. Instead, however, the clear juice or impure cane-derived sugar juice which is used as feedstock can be that obtained by any other suitable preparation process.

The impure cane-derived juice is typically at an elevated temperature, eg a temperature above 90° C. Thus, the microfiltration/ultrafiltration will also be effected at elevated temperature; however, since ion exchange normally takes place at a lower temperature, eg at a temperature below 60° C., such as at about 10° C., the juice will normally be cooled before ion exchange.

The impure sugar juice as obtained from sugar cane stalks as hereinbefore described, has a low sugar or sucrose concentration, typically less than 15% (m/m), for example in the order of 10% to 15% (m/m). This low concentration impure sugar juice is suitable as a feedstock for the process of the present invention; however, it is believed that it will be advantageous to use a higher concentration impure sugar juice as feedstock, eg to reduce the cost of the capital equipment required to treat the same amount of sugar or sucrose. Thus, the process may include concentrating, eg by means of evaporation, the impure sugar juice before it enters the clarification stage. It may be concentrated to a sugar or sucrose concentration of at least 20% (m/m), preferably from 20% to 40% (m/m), typically about 25% (m/m).

The impure cane-derived sugar juice will thus normally, during preparation thereof, have been subjected to initial or primary clarification; the treatment in the clarification stage of the process of the invention thus constitutes secondary clarification of the sugar juice. In the secondary clarification stage, sufficient suspended solids, organic non-sugar impurities and colour are removed to render the sugar amenable to subsequent treatment in the ion exchange stage. During the secondary clarification, the sugar juice may be passed through a membrane in the size range 15000 Dalton to 300000 Dalton or 200 Angstrom to 0,2 micron. The Applicant has found that microfiltration/ultrafiltration prior to ion exchange is important in order to inhibit rapid fouling of the ion exchange resins, and to ensure that the refined white sugar product meets the required turbidity specifications.

In the ion exchange stage, de-ashing or demineralization and further colour removal takes place. The contacting of the clarified sugar juice with resins is effected in such a manner that inversion, ie breakdown of sucrose to glucose and fructose is kept as low as possible, and resin use is optimized.

In certain circumstances, strong acid cation resins can catalyze the inversion reaction of sucrose. To inhibit sucrose inversion in such cases, the ion exchange, or a portion of the ion exchange, can be effected at sugar juice temperatures below 30° C. The process may thus include, when necessary, reducing the impure sugar juice temperature to below 30° C., ahead of or during its passage through the ion exchange stage. For example, the sugar juice temperature can be reduced to about 10° C., eg by using a refrigeration plant, to ensure minimal sucrose inversion.

The ion exchange stage may be provided by a simulated moving bed arrangement or system, eg by a continuous fluid-solid contacting apparatus such as that described in U.S. Pat. No. 5,676,826; by a separation train system such as that described in U.S. Pat. No. 5,122,275; or the like.

The process may include subjecting the clarified sugar juice to a first pass through the ion exchange stage, to obtain a partially purified sugar solution, and thereafter subjecting the partially purified sugar solution to at least one further pass through the ion exchange stage, to obtain the purified sugar solution.

The process includes regenerating the resins from time to time, as required. Thus, the strong acid cation resin may be regenerated by contacting it with a strong acid, such as hydrochloric acid or nitric acid, with an acid stream rich in potassium salts thereby being obtained. This component is suitable for use as a fertilizer feedstock. The anion resin may be regenerated by contacting it with a strong or weak base such as sodium hydroxide, potassium hydroxide, ammonium hydroxide, or a combination of sodium or potassium hydroxide and ammonium hydroxide, with an alkaline stream which is rich in nitrogen being obtained. This component is also suitable for use as a fertilizer feedstock.

As indicated hereinbefore, de-ashing or demineralization (cations and anions) and colour removal are effected simultaneously in the ion exchange stage. However, the Applicant has found that it is not always the most efficient route to remove all colour during passage of the sugar juice through the ion exchange stage. Some colour may thus, if desired, be removed in the ion exchange stage, with the remaining colour then being removed by further treatment of the sugar juice.

Thus, in one embodiment of the invention, the process may include subjecting the purified sugar solution from the ion exchange stage, or the partially purified sugar solution of the ion exchange stage, to further decolourizing in a decolourizing stage.

The decolourizing stage may comprise an anion resin, in particular an anion resin in hydroxide or chloride form; an absorption resin; activated carbon; or another absorption medium.

When the decolourizing stage includes an anion resin in the chloride form, the partially purified sugar solution, after the first pass thereof through the ion exchange stage, may be brought into contact with the anion resin in the chloride form in the further ion exchange stage, and thereafter subjected to a second pass through the ion exchange stage.

When the decolourizing stage includes an anion resin in the hydroxide form, an absorption resin, activated carbon, or another absorption medium, the purified sugar solution from the ion exchange stage may be brought into contact with the anion resin, the absorption resin, the activated carbon or the other absorption medium.

The concentration of the purified sugar solution into the syrup may be effected by means of evaporation. The resultant syrup may have a sucrose or sugar concentration of about 65% (m/m).

The primary crystallization may be effected in a plurality of sequential primary stages or boilings. The secondary crystallization may also be effected in a plurality of sequential primary stages or boilings. The purge or mother liquor from the primary crystallization is thus exhausted further by the secondary crystallization to recover the impure sugar crystals. The impure crystallized sugar from all the secondary crystallization stages or boilings may be remelted or redissolved, and recycled to the syrup ahead of the primary crystallization stages. This recycle is typically less than 20% of the total feed to the primary crystallization stages. The purge or mother liquor from the secondary or exhaustion crystallization stages is thus defined as the white strap molasses.

In another embodiment of the invention, the process may include subjecting the syrup, prior to the primary crystallization, to decolourizing crystallization in a decolourizing crystallization stage, to produce high colour white sugar and tertiary molasses; remelting or redissolving the high colour white sugar to produce a remelted sugar solution which is then subjected to the primary crystallization in the primary crystallization stages; returning the primary mother liquor or molasses produced in the primary crystallization stages to the decolourizing crystallization stage; subjecting the tertiary molasses from the decolourizing crystallization stage to mill crystallization in a mill crystallization stage to produce the white strap molasses and impure crystallized low colour sugar; and returning the impure crystallized low colour sugar to the decolourizing crystallization stage, with the decolouring crystallization and the mill crystallization constituting the secondary crystallization.

The white strap molasses is a low ash material suitable for various uses, eg for fermentation, for the manufacture of high purity by-products, can be subjected to chromatographic separation for recovery of sucrose, or can be used as a liquid sugar source. Thus, the white strap molasses is a secondary high value product. The white strap molasses has, without further processing thereof, the following typical properties:

sucrose content of less than 40% on a dry solids basis;

sugar (sucrose, glucose and fructose) content of more than 75% on a dry solids basis, with the sucrose fraction depending on the ion-exchange stages;

ash (inorganic material) content of less then 2,0%;

organic non-sugars of less than 24%.

The invention extends also to the products obtained from the process of the invention, ie a potassium-rich acid stream or component, a nitrogen-rich alkaline stream or component, white strap molasses, and refined sugar, when produced by the process of the invention.

The Applicant has unexpectedly found that by subjecting impure cane-derived sugar juice to microfiltration/ultrafiltration and subsequent ion exchange in accordance with the invention, removal of substantially all the colour and turbidity which is present in the impure cane-derived sugar juice is achieved. A purified sugar solution suitable for the direct production of white or refined sugar without any pre-crystallization or raw sugar house treatment thereof being required, is thereby obtained.

By contacting the clarified sugar juice with a strong acid cation exchange resin in the hydrogen form followed by an anion exchange resin in the hydroxide form, substantially all inorganic ions are removed; however, it was also unexpectedly found that in excess of 60% of the organic non-sugars present in the sugar juice are also thereby removed. This thus means that in excess of 70% of the molasses non-sugar components are removed by the ion exchange, which leads to higher overall recovery of sucrose if sucrose inversion is minimized, as herein described.

To minimize inversion of sucrose to glucose and fructose, the ion exchange is, as hereinbefore described, preferably effected in a simulated moving bed and at a low temperature. The simulated moving bed allows the acid released to be neutralized as the juice passes through the ion exchange bed, and also reduces the residence time. It was thus surprisingly found that by subjecting the sugar juice to ion exchange in a simulated moving bed, having at least one pass, at about 50° C., or at an even lower temperature, eg at about 10° C., in certain cases, the inversion is reduced to less than 1%.

To obtain both low inversion and sufficient colour and non-sugar impurity removal is critical in order to achieve an economically viable process.

The invention will now be described by way of example with reference to the accompanying drawings.

Figure 2:
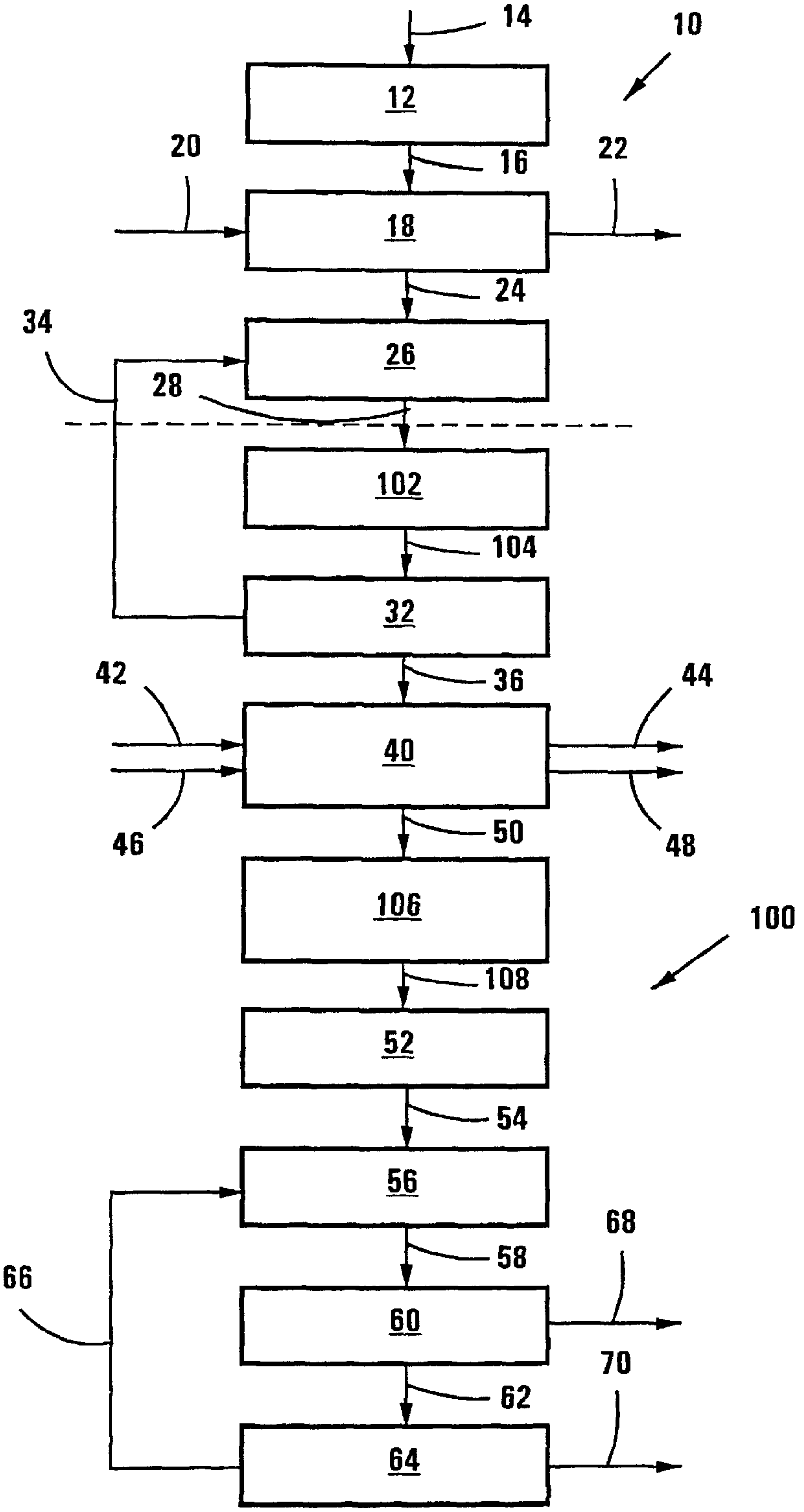
Figure 3:
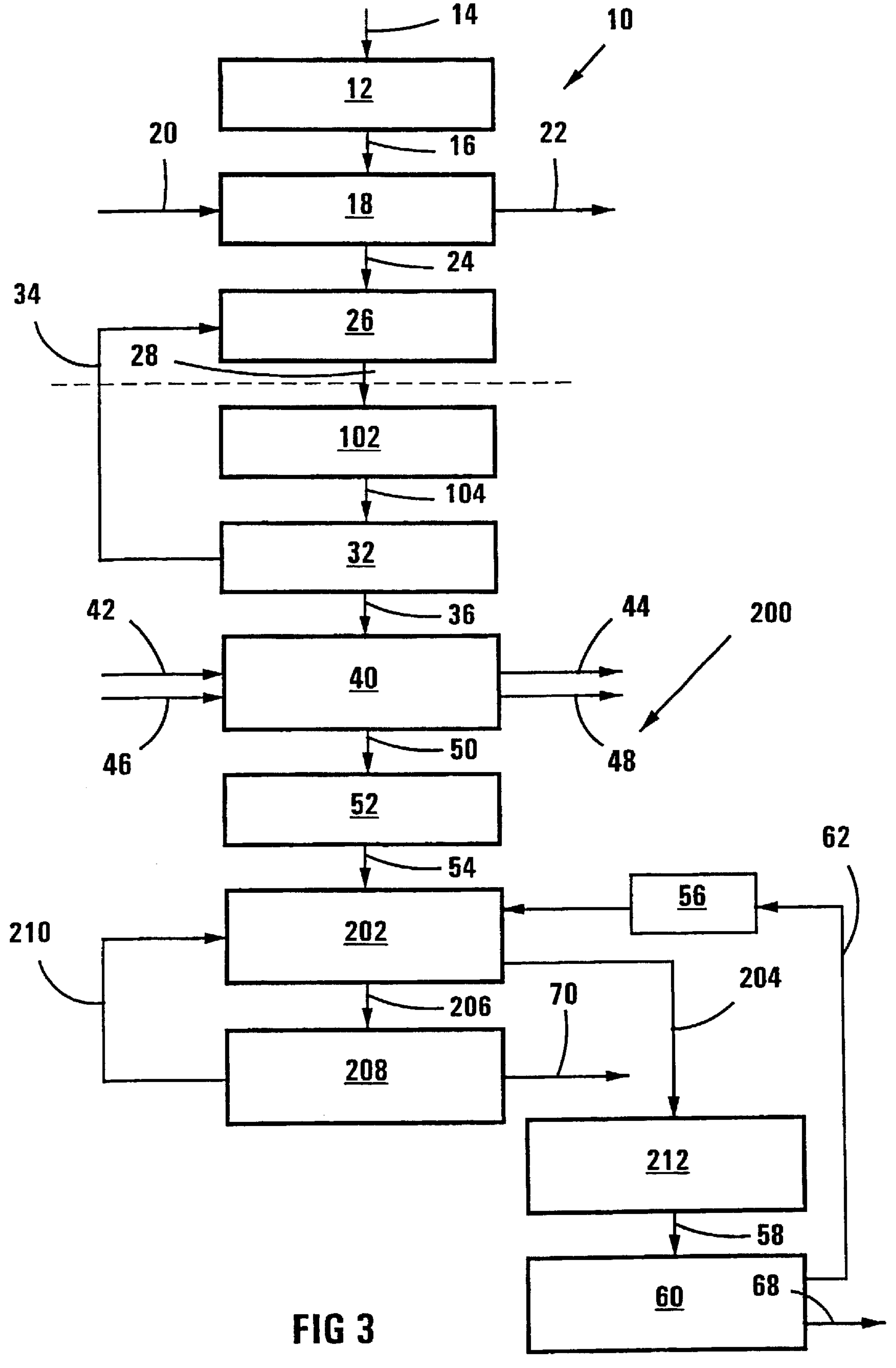

In the drawings,

FIG. 1 is a flow diagram of an impure cane-derived sugar juice preparation process, as well as a process according to one aspect of the invention for treating the resultant impure cane-derived sugar juice; and FIGS. 2 and 3 are similar flow diagrams of impure cane-derived sugar juice preparation processes, as well as processes according to second and third aspects of the invention, respectively, for treating the resultant impure cane-derived sugar juice.

In FIGS. 1, 2 and 3, similar stages and flow lines are indicated with the same reference numerals.

Referring to FIG. 1, reference numeral 10 generally indicates a process for producing impure cane-derived sugar juice.

The process 10 includes a cane stalk preparation stage 12, with a sugar cane stalk feed line 14 leading into the stage 12.

A disintegrated stalk transfer line 16 leads from the stage 12 to a diffuser stage 18, with an imbibition water feed line 20 also leading into the stage 18. A fibrous residue or bagasse withdrawal line 22 leads from the stage 18.

A mixed juice flow line 24 leads from the stage 18 to a primary clarification stage 26, with a clear juice flow line 28 leading from the stage 26.

Reference numeral 30 generally indicates a process according to a first aspect of the invention, for treating impure cane-derived sugar juice or clear juice from the process 10.

The process 30 includes a secondary clarification stage 32, with the clear juice flow line 28 leading into the stage 32. A recycle line 34 leads from the stage 32 back to the primary clarification stage 26 or to the diffuser stage 18 (not shown) or to a separate clarification stage (not shown).

A clarified sugar juice transfer line 36 leads from the stage 32 to a simulated moving bed ion exchange stage or system 40. The stage or system 40 comprises a continuous fluid-solid contacting apparatus, such as that taught in U.S. Pat. No. 5,676,826, and which simulates a moving bed ion exchange arrangement in which the clarified sugar juice passes sequentially through one or multiple ion exchange passes. The or each ion exchange pass comprises a strong acid cation ion exchange resin in the hydrogen form, followed by an anion ion exchange resin in the hydroxide form.

A strong acid feed line 42 leads into the stage or system 40, with a potassium-rich acid withdrawal line 44 leading from the system 40. A base feed line 46, for feeding a strong or weak base such as sodium hydroxide, potassium hydroxide and/or ammonium hydroxide, also leads into the stage or system 40, while a nitrogen-rich alkaline stream withdrawal line 48 leads from the system 40.

A purified sugar solution withdrawal line 50 leads from the system 40 to an evaporation stage 52, with a syrup transfer line 54 leading from the stage 52 to a redissolution and storage stage 56. A line 58 leads from the stage 56 to a primary or refining crystallization stage 60. A transfer line 62 leads from the refining crystallization stage 60 to a secondary or recovery crystallization stage 64. A recycle line 66 leads from the stage 64 back to the stage 56.

A refined white sugar withdrawal line 68 leads from the stage 60, while a white strap molasses withdrawal line 70 leads from the stage 64.

In use, cane stalks enter the cane stalk preparation stage 12 along the line 14. In the stage 12, they are disintegrated and broken up, ie prepared for further processing. The disintegrated stalks pass, along the line 16, into the diffuser stage 18, where cane juice is removed therefrom by means of imbibition water which enters the stage 18 along the line 20. Fibrous residue or bagasse is withdrawn along the line 22, and can be used as a fuel.

Mixed juice from the stage 18 is heated and limed (not shown), and then passes into the primary clarification stage 26, typically at a temperature above 95° C. In the primary clarification stage 26, which typically comprises a gravity settler, mud settles from clear juice, is removed and filtered in filters (not shown) or returned to the diffuser stage 18. Where filters are used, the filtrate from the filters is returned to ahead of the primary clarification stage 26, while the filter cake is discarded.

The overflow from the clarification stage 26, ie clear juice or impure cane-derived sugar juice, passes along the flow line 28 to the secondary clarification stage 32 where it is subjected to microfiltration/ultrafiltration by passing it through a membrane in the range 15000 Dalton to 300000 Dalton or 200 Angstrom to 0,2 micron, thereby to remove suspended solids, organic non-sugar impurities and some colour. Clarified sugar juice is thus obtained in the stage 32. The concentrate or retentate from the secondary clarification stage 32 is recycled, along the flow line 34, to the primary clarification stage 26 or to the diffuser stage 18 to recover the sugar from the secondary clarification or filtration concentrate and to remove the impurities retained through further clarification. The bulk of the clarified sugar juice passes, after being cooled down to 10° C., along the flow line 36 to the simulated moving bed ion exchange system 40 where it passes sequentially through one or more ion exchange passes.

The strong acid cation exchange resin is regenerated by contacting it with hydrochloric acid or nitric acid entering along the flow line 42, with a potassium-rich acid stream being withdrawn along the flow line 44. Simultaneously, the anion ion exchange resin is regenerated by means of a strong or weak base such as sodium hydroxide, potassium hydroxide, ammonium hydroxide, or a mixture of two or more thereof, which enters along the flow line 46, with a nitrogen-rich alkaline stream being withdrawn along the flow line 48. The streams that are withdrawn along the flow lines 44, 48 are suitable for use as fertilizer feedstocks.

Purified sugar solution passes from the stage 40 along the flow line 50 to the evaporator 52 where it is evaporated into a syrup. The syrup passes along the flow line 54 to the stage 56 where it joins impure crystallized sugar which is returned via line 66 from the recovery crystallization stage 64, which sugar is redissolved or remelted. The combination syrup and remelt stream passes along the flow line 58 to the refining crystallization stage 60 where it is subjected to primary or refining crystallization in known fashion, with crystalline refined white sugar being separated from the resultant primary mother liquor, and being withdrawn along the flow line 68.

The primary mother liquor passes from the stage 60 along the flow line 62 to the recovery crystallization stage 64 where it is typically subjected to from two up to four boilings for secondary or recovery crystallization thereof, with recovered impure crystallized sugar being recycled to the stage 56. White strap molasses is withdrawn along the flow line 70.

The white strap molasses 70, as hereinbefore described, typically has a sucrose purity less than 40%; a sugars content (sucrose, glucose and fructose) of more than 75%; an ash content of less than 2.0% and an organic non-sugar content of less than 24%.

The process 30 was simulated on pilot plant scale in the following non-limiting example:

EXAMPLE 1

A primary clarified sugar juice with the characteristics shown in the second row of Table 1 was generated from a sugar cane extraction plant. After secondary clarification by microfiltration/ultrafiltration (15000 D ceramic membrane) of the juice, the solution had the analysis shown in Table 1 (row 3). The sugar solution was now passed through two ISEP (L-100B) (trademark) units obtainable from Advanced Separation Technology Inc of 5315 Great Oak Drive, Lakeland, Fla. 33815, USA. These units are simulated moving bed strong acid cation/anion ion exchange resin systems. The cation resin used was Amberlite IRA 252 RF (trademark) H styrenic macroporous strong acid resin. The anion resin used was Amberlite IRA 958 (trademark) Cl (but running as OH) acrylic macroreticular strong base resin. Both these resins were supplied by Rohm & Haas, 5000 Richmond Street, Philadelphia, Pa. 19137, USA. The cation resin was regenerated with hydrochloric acid, while the anion resin was regenerated with caustic soda solution. The units were configured so as to minimize residence time of the juice in contact with either the anion or cation resins. The deionized solution characteristics are shown in Table 1. The deionized juice was concentrated, crystallized, and centrifuged to yield a white strap molasses and a refined sugar. The final sugar produced met the specification as shown in Table 2.

TABLE 1

| Treatment | Total dissolved solids (Brix) | Turbidity ICUMSA | Colour ICUMSA | Ash (% m/m) |
|---|---|---|---|---|
| Primary Clarified Juice | 12 | 9000 | 22000 | .43 |
| Secondary Clarified Juice | 12 | 500 | 15000 | .43 |
| Deionized Juice | 10 | 4 | 135 | <.01 |
| White Strap Molasses | 84 | <500 | <5000 | <1 |

TABLE 2

| Analysis | |
|---|---|
| Pol | Greater than 99.9% |
| Ash | Less than 0.015% |
| Colour (ICUMSA) | Less than 40 |
| Invert Sugars | Less than 0.1% |

Table 3 illustrates the impact of ion-exchange passes and residence time on inversion. For the ion exchange, the sugar stream temperature is in the range of 40° C. to 75° C., and the fluid residence time in the range of 1 to 15 minutes.

TABLE 3

| Sugar Stream | Passes | Feed Temp-erature | Solu-tion | Solution Residence Time | Ash Removal | Sucrose Inversion |
|---|---|---|---|---|---|---|
| Clear Juice | 3 (three) | 30° C. (average) | 12 brix | 10 min | >98% (average) | 1.0% (average) |

Table 4 illustrates the removal of impurities compared to black strap molasses.

The process of the invention eliminates the production of non-sugar impurities of the conventional raw sugar factory, which adds about 8% non-sugar impurities compared to the feed non-sugar impurities.

TABLE 4

| Technology | Name of Purge (Molasses) | Removal of non-sugar impurities via Ion-Exchange | Removal of non-sugar impurities via Crystallization Purge (Molasses) |
|---|---|---|---|
| Conventional Raw Sugar Recovery | Black Strap Molasses | 0% of feed | 104% of feed |
| The process of the invention | White Strap Molasses | 71% of feed | 29% of feed |

Referring to FIG. 2, reference numeral 100 generally indicates a process according to a second aspect of the invention, for treating impure cane-derived sugar juice or clear juice from the process 10.

The process 100 is similar to the process 30. However, the process 100 includes an evaporation stage 102 between the primary clarification stage 26 and the secondary clarification stage 32. The clear juice flow line 28 thus leads into the stage 102 rather than into the stage 32. In the evaporation stage 102, the clear or impure cane-derived sugar juice is concentrated, by means of evaporation, from a sugar or sucrose concentration of 10% to 12% (m/m) to about 25% (m/m), with the concentrated clear juice passing to the secondary clarification stage 32 along a flow line 104.

The process 100 also includes an additional decolourizing stage 106, downstream of the ion exchange system or stage

40, with the flow line 50 leading into the stage 106, and a line 108 leading from the stage 106 to the evaporation stage 52. The concentrated clarified sugar juice typically passes through two ion exchange passes in the ion exchange stage 40, before passing to the decolourizing stage 106 where it is contacted with an anion resin in the hydroxide or chloride form, an absorption resin, activated carbon, or another absorption medium. In the decolourizing stage 106 the residual or remaining colour is removed, with only some of the colour thus having been removed in the stage 40.

The process 100 was simulated on pilot plant scale in the following non-limiting example.

EXAMPLE 2

A primary clarified sugar juice with the characteristics shown in the second row of Table 5 was generated from a sugar cane extraction plant. After secondary clarification by microfiltration/ultrafiltration (500 Angstrom ceramic membrane) of the juice, the solution had the analysis shown in Table 5 (row 3). The sugar solution was now passed through two ISEP (L-100B) and one ISEP (L100C) (trademark) units obtainable from Advanced Separation Technology Inc of 5315 Great Oak Drive, Lakeland, Fla. 33815, USA. These units are simulated moving bed strong acid cation/anion ion exchange resin systems. The cation resin used was Amberlite IRA 252 RF (trademark) H styrenic macroporous strong acid resin. The anion resin used was Amberlite IRA 92 (trademark) (but running as OH) styrenic macroporous weak base resin. The decolourizing resin used was Amberlite IRA 958 (trademark) Cl (running as either OH or Cl) acrylic macroreticular strong base resin. All these resins were supplied by Rohm & Haas, 5000 Richmond Street, Philadelphia, Pa. 19137, USA. The cation resin was regenerated with hydrochloric acid, while the anion resin was regenerated with caustic soda solution. The decolourizing resin was regenerated with brine or caustic soda solution. The units were configured so as to minimize residence time of the juice in contact with either the anion or cation resins. The deionized solution characteristics are shown in Table 5. The deionized juice was concentrated, crystallized, and centrifuged to yield a white strap molasses and a refined sugar. The final sugar produced met the specification shown in Table 6.

TABLE 5

| Treatment | Total dissolved solids (Brix) | Turbidity ICUMSA | Colour ICUMSA | Ash (% m/m) |
|---|---|---|---|---|
| Primary Clarified Juice | 13 | 4140 | 16940 | .48 |
| Secondary Clarified Juice | 13 | <500 | 16000 | .48 |
| Deionized Juice | 13 | <400 | <6000 | <.025 |
| Decolourized Juice | 13 | <200 | <300 | <.025 |

TABLE 6

| Analysis | |
|---|---|
| Pol | Greater than 99.7% |
| Ash | Less than 0.005% |
| Colour (ICUMSA) | Less than 40 |
| Invert Sugars | Less than 0.04% |

Referring to FIG. 3, reference numeral 200 generally indicates a process according to a third aspect of the invention, for treating impure cane-derived sugar juice or clear juice from the process 10.

The process 200 is similar to the processes 30, 100 in certain respects. For example, it includes the evaporation stage 102 of the process 100, and is similar otherwise to the process 30, up to the evaporation stage 52.

The flow line 54 from the evaporation stage 52, in the process 200, leads to a decolourizing crystallization stage 202, where the syrup is typically subjected to one boiling, with low colour sugar and tertiary molasses being produced.

The low colour sugar passes along a flow line 204 to a remelt or redissolution stage 212, with the redissolved sugar syrup, at a sugar concentration of about 65% (m/m), passing along the flow line 58 to the refining crystallization stage 60, where it is typically subjected to four boilings.

The flow line 62 from the stage 60 leads back to the dissolution stage 56 and then to the stage 202.

The tertiary molasses produced in the stage 202 pass along a flow line 206 to a mill crystallization stage 208, where it is typically subjected to three boilings, with white strap molasses and impure crystallized sugar being produced. The white strap molasses is withdrawn along the flow line 70, which thus leads from the stage 208, while the impure sugar is returned to the stage 202 along a flow line 210.

The mill crystallization stage 208 may typically comprise three boilings or stages (not shown), with the impure sugar from the second and third stages being recycled, with remelting, to the first stage; with the molasses passing sequentially from the first to the second and then to the third stage where it is withdrawn along the flow line 70, and with the impure sugar from the first stage then passing along the recycle line 210, with remelting, back to the stage 202.

The process of the invention enables refined sugar to be produced in a raw sugar factory or mill without the need for a standard cane sugar refinery plant, by using microfiltration/ultrafiltration clarification and ion exchange de-ashing and decolourizing.

In the process of the invention, white sugar can thus be produced directly from cane-derived sugar juice, at an increased recovery compared to a standard cane raw sugar mill. The increased recovery is in the range of 2% to 9% additional sucrose recovery at white sugar quality.

A low colour, low ash, high purity molasses, ie the white strap molasses, is also obtained from the process according to the invention, together with potassium fertilizer and ammonium-based fertilizer components.

The Applicants have thus surprisingly found that with the process of the present invention, the production of crystalline sugar can be maximized while minimizing the formation of liquid sugar, ie minimizing inversion.

It is believed that by using the cation exchange resin followed by the anion exchange resin, particularly good results are achieved. For example, a mixed cation/anion resin bed would present problems, eg it would be difficult to regenerate economically, and is avoided in the present process. The process of the invention is thus characterized thereby that it avoids the use of a mixed bed ion exchange resin.

In the process of the present invention, the problem of excessive inversion is overcome, or at least reduced, by use of the ion exchange stage containing the cation and anion resins which the sugar juice contacts sequentially, and in particular the use of a simulated moving bed ion exchange stage, coupled with temperature control during the ion exchange.

Another important feature of the present invention is the provision, in one version of the invention, of a separate decolourization stage for final colour removal in addition to the ion exchange stage, which is then used primarily for demineralization or ash removal. This permits ready optimization of both the demineralization and the decolourization of the sugar juice, and reduces the risk of inversion during cation exchange in the ion exchange stage.

The Applicants have also unexpectedly found that the process of the present invention, which embodies microfiltration/ultrafiltration, as well as demineralization and at least some decolourization of the juice prior to evaporation thereof into a syrup and crystallization into sugar, is both technically and economically feasible. In particular, it was surprisingly found that the process of the present invention simultaneously fulfills the following requirements:

- it directly produces refined sugar which meets universal specifications for colour, turbidity and ash, ie the process removes colour and ash;
- it produces a high quality liquid sugar, ie the white strap molasses;
- there is low inversion during processing, ie minimal sugar loss; and
- there is efficiency of chemical usage.

The Applicants have further unexpectedly found that features such as using the simulated moving bed, and separating the final colour removal from the demineralization, make the process more economically viable. The separation of the final colour removal from the demineralization was found to be necessary in some cases because the kinetics of these operations are not the same and furthermore the ash and colour levels are not in proportion to one another. The Applicants thus found complete de-ashing and decolourizing at high chemical efficiency can often not be achieved without separating the demineralization from the colour removal operation.

It is also believed that the approach, in the process of this invention, of removing substantially all impurities from the sucrose solution, ie from the sugar juice, by means of ultrafiltration/microfiltration and subsequent ion exchange prior to crystallization, rather than using crystallization itself for purification of the sugar, is unique.

It is further believed that the ability of the process of the invention to produce, in an economically feasible fashion, two useful sugar streams, namely the refined white crystallized sugar and the white strap molasses, is unique and unexpected.

What is claimed is:

1. A process for treating impure cane derived sugar juice, which process comprises

- subjecting, in a clarification stage, impure cane derived sugar juice to microfiltration/ultrafiltration to decrease the levels of suspended solids, organic non sugar impurities and/or colour therein;
- sequentially passing the resultant clarified sugar juice through at least one ion exchange stage by bringing the clarified sugar juice into contact with a strong acid cation ion exchange resin in the hydrogen form, and thereafter into contact with an anion ion exchange resin in the hydroxide form;
- withdrawing a purified sugar solution from the ion exchange stage;
- concentrating the purified sugar solution, to produce a syrup;
- subjecting the syrup to primary crystallization in at least one primary crystallization stage, to produce refined white sugar and primary mother liquor or molasses;
- subjecting the primary mother liquor to secondary crystallization in at least one secondary crystallization stage, to produce impure crystallized sugar and secondary mother liquor or white strap molasses.

2. A process according to claim 1, wherein the Impure juice that is subjected to the microfiltration/ultrafiltration is at a temperature of at least 90° C., with the microfiltration/ultrafiltration comprising passing the impure juice through a membrane In the size range 15000 Dalton to 300000 Dalton or 200 Angstrom to 0.2 micron, and wherein the clarified sugar juice is cooled to a temperature below 60° C. before it enters the ion exchange stage.

3. A process according to claim 2, which includes concentrating the impure sugar juice, before it enters the clarification stage, to a sugar or sucrose concentration of at least 20% (m/m).

4. A process according to claim 2, wherein the clarified sugar juice is cooled to a temperature below 30° C. before It enters the ion exchange stage, or while it passes through the ion exchange stage.

5. A process according to claim 1, wherein the ion exchange stage comprises a simulated moving bed arrangement or system.

6. A process according to claim 1, which includes subjecting the clarified sugar juice to a first pass through the ion exchange stage, to obtain a partially purified sugar solution, and thereafter subjecting the partially purified sugar solution to at least one further pass through the ion exchange stage, to obtain the purified sugar solution.

7. A process according to claim 6, which includes regenerating the resins from time to time by contacting the strong acid cation resin with a strong acid, with an acid stream rich in potassium salts thereby being obtained, and contacting the anion resin with a strong or weak base, with an alkaline stream with is rich in nitrogen thereby being obtained.

8. A process according to claim 6, wherein the concentration of the purified sugar solution into the syrup is effected by means of evaporation, with the resultant syrup having a sucrose or sugar concentration of about 65% (m/m).

9. A process according to claim 6, which includes subjecting the purified sugar solution from the ion exchange stage, or the partially purified sugar solution of the ion exchange stage, to further decolourizing in a decolourizing stage.

10. A process according to claim 9, wherein the decolourizing stage includes an anion resin In the chloride form, with the partially purified sugar solution, after the first pass thereof through the ion exchange stage, being brought into contact with the anion resin in the chloride form in the further ion exchange stage, and thereafter being subjected to the second pass through the ion exchange stage.

11. A process according to claim 9, wherein the decolourizing stage includes an anion resin in the hydroxide form, an absorption resin, activated carbon, or another absorption medium, with the purified sugar solution from the ion exchange stage being brought into contact with the anion resin, the absorption resin, the activated carbon or the other absorption medium.

12. A process according to claim 10, wherein the primary crystallization is effected in a plurality of sequential stages or boilings, with the secondary crystallization also being effected in a plurality of sequential stages or boilings, and with the Impure crystallized sugar from all the secondary crystallization stages or boilings being remelted or redissolved and recycled to the syrup ahead of the primary crystallization stage.

13. A process according to claim 6, which includes subjecting the syrup, prior to the primary crystallization, to decolourizing crystallization in a decolourizing crystallization stage, to produce low colour white sugar and tertiary molasses;

remelting or redissolving the low colour white sugar to produce a remelted sugar solution which is then subjected to the primary crystallization in the primary crystallization stage;

returning the primary mother liquor or molasses produced in the primary crystallization stage to the decolourizing crystallization stage; subjecting the tertiary molasses from the decolourizing crystallization stage to mill crystallization in a mill crystallization stage to produce the white strap molasses and impure crystallized white sugar; and returning the impure crystallized white sugar to the decolourizing crystallization stage, with the decolouring crystallization and the mill crystallization constituting the secondary crystallization.

14. A process for treating impure cane derived sugar juice, which process comprises subjecting, in a clarification stage, impure cane derived sugar juice to microfiltration/ultrafiltration to decrease the levels of suspended solids, organic non sugar impurities and/or colour therein;

sequentially passing the resultant clarified sugar juice through at least one ion exchange stage by bringing the clarified sugar juice into contact with a strong acid cation ion exchange resin in the hydrogen form, and thereafter into contact with an anion ion exchange resin in the hydroxide form;

withdrawing a purified sugar solution from the ion exchange stage;

subjecting the purified sugar solution from the ion exchange stage to further decolourizing in a decolourizing stage, to obtain a decolourized purified sugar solution;

concentrating the purified sugar solution, to produce a syrup;

subjecting the syrup to primary crystallization in at least one primary crystallization stage, to produce refined white sugar and primary mother liquor or molasses;

subjecting the primary mother liquor to secondary crystallization in at least one secondary crystallization stage, to produce impure crystallized sugar and secondary mother liquor or white strap molasses.

15. A process for treating impure cane derived sugar juice, which process comprises:

subjecting, in a clarification stage, impure cane derived sugar juice to microfiltration/ultrafiltration to decrease the levels of suspended solids, organic non sugar impurities and/or colour therein;

sequentially passing the resultant clarified sugar juice through an ion exchange stage comprising a simulated moving bed ion exchange system wherein the clarified sugar juice is brought into contact with a strong acid cation ion exchange resin in the hydrogen form, and thereafter into contact with an anion ion exchange resin in the hydroxide form;

cooling the clarified sugar juice to a temperature below 30° C. before it enters the ion exchange stage, or while it passes through the ion exchange stage;

withdrawing a purified sugar solution from the ion exchange stage;

concentrating the purified sugar solution, to produce a syrup;

subjecting the syrup to primary crystallization in at least one primary crystallization stage, to produce refined white sugar and primary mother liquor or molasses;

subjecting the primary mother liquor to secondary crystallization in at least one secondary crystallization stage, to produce impure crystallized sugar and secondary mother liquor or white strap molasses.

* * * * *

UNITED STATES PATENT AND TRADEMARK OFFICE

CERTIFICATE OF CORRECTION

PATENT NO. : 6,709,527 B1

DATED : March 23, 2004

INVENTOR(S) : Wolfgang L. Fechter et al.

It is certified that error appears in the above-identified patent and that said Letters Patent is hereby corrected as shown below:

<u>Column 11,</u>

Line 1, after “wherein the” delete “Impure” and substitute -- impure -- in its place.
Line 5, after “membrane” delete “In” and substitute -- in -- in its place.
Line 14, before “enters” delete “It” and substitute -- it -- in its place.
Line 29, before “is rich” delete “with” and substitute -- which -- in its place.
Line 39, after “anion resin” delete “In” and substitute -- in -- in its place.
Line 55, after “with the” delete “Impure” and substitute -- impure -- in its place.

Signed and Sealed this

Third Day of May, 2005

JON W. DUDAS

*Director of the United States Patent and Trademark Office*